United States Patent [19]

Bainard et al.

[11] 4,166,627
[45] Sep. 4, 1979

[54] THRUST WASHER AND COMBINATION SEAL AND THRUST WASHER

[75] Inventors: Dean R. Bainard, Bethel Township, York County, S.C.; Martin E. Benjamin, Gastonia, N.C.

[73] Assignee: Garlock Inc., Palmyra, N.Y.

[21] Appl. No.: 733,890

[22] Filed: Oct. 19, 1976

[51] Int. Cl.² ............................................. F16J 15/34
[52] U.S. Cl. .............................. 277/95; 277/212 C; 277/227; 308/187.1
[58] Field of Search .............. 277/152, 37, 95, 85, 277/82, 153, 212 C, 227; 308/163, 187.1; 85/50 R

[56] References Cited
U.S. PATENT DOCUMENTS

| | | | |
|---|---|---|---|
| 3,179,424 | 4/1965 | Carson et al. | 277/37 |
| 3,428,375 | 2/1969 | Martin | 277/95 |
| 3,479,840 | 11/1969 | Meyers | 277/95 |
| 3,482,844 | 12/1969 | McKinven | 277/82 |
| 3,494,681 | 2/1970 | Anderson et al. | 277/82 |
| 3,545,774 | 12/1970 | Rickley | 277/95 |
| 3,822,890 | 7/1974 | Bourgeois | 277/82 |
| 3,844,631 | 10/1974 | Otto et al. | 308/187.1 |
| 3,913,924 | 10/1975 | Barefoot et al. | 277/37 |
| 3,951,482 | 4/1976 | Blaydon et al. | 308/187.1 |
| 3,963,248 | 6/1976 | Bainard | 277/82 |

*Primary Examiner*—Lenard A. Footland
*Attorney, Agent, or Firm*—Schovee & Boston

[57] ABSTRACT

A thrust washer having a backing layer of resilient material such as rubber or other elastomers and having, for example, a polytetrafluoroethylene bearing surface, which can include one or more integral sealing lips formed from the polytetrafluoroethylene bearing material. Another aspect of this invention is a unitary article including said resiliently-backed thrust washer in combination with a seal. This unitary article can be purchased and installed as a unit taking the place of four separate prior art elements that had to be purchased and installed separately.

29 Claims, 3 Drawing Figures

THRUST WASHER AND COMBINATION SEAL AND THRUST WASHER

BACKGROUND OF THE INVENTION

1. Field of the Invention

This invention relates to thrust washers and to seals and in particular to an improved thrust washer and also to a unitary combination of said improved thrust washer and a seal.

2. Description of the Prior Art

In many applications, seals are used in proximity to thrust washers which can be, for example, a ring made of treated nylon material. These parts are purchased separately and installed separately. In addition, some applications require the four separate parts of: (1) a metal, seal-retaining ring, (2) a primary seal, (3) a thrust washer, and (4) a secondary seal, which separate parts must be purchased separately and installed separately.

It is an object of the present invention to overcome such problems in the prior art and to provide a unitary seal and thrust washer.

In prior art applications requiring thrust washers and which are not under load at all times, the prior art thrust washers have a tendency to "pound out" (plastics have a tendency to "plastic flow" which means, for example, that if a plastic thrust washer is hit enough times with no give, it has a tendency to deform and change its shape or extrude slightly).

It is another object of the present invention to overcome such problems in the prior art by providing a resiliently backed thrust washer and to also prevent shock build-up between two axially movable members. It is another object of the present invention to provide a rubber-backed thrust washer having an integral sealing lip.

SUMMARY OF THE INVENTION

A unitary seal and thrust washer which, in the preferred embodiment, includes a resilient, one-piece, molded elastomeric body forming the major part of both the seal and the thrust washer. The seal includes a mounting portion, preferably with an annular metal shell bonded to the elastomeric body, and a sealing portion with, in a preferred embodiment, a pair of sealing lips. The integral thrust washer is ring shaped and includes, in a preferred embodiment, a polytetrafluoroethylene bearing surface. In a preferred embodiment, the thrust washer includes an additional polytetrafluoroethylene sealing lip, formed as an extension of the material of the polytetrafluoroethylene bearing surface.

Another aspect of this invention is the rubber-backed thrust washer per se, with an integral sealing lip, if desired, formed, for example, as an extension of the polytetrafluoroethylene liner that forms the bearing surface.

BRIEF DESCRIPTION OF THE DRAWING

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
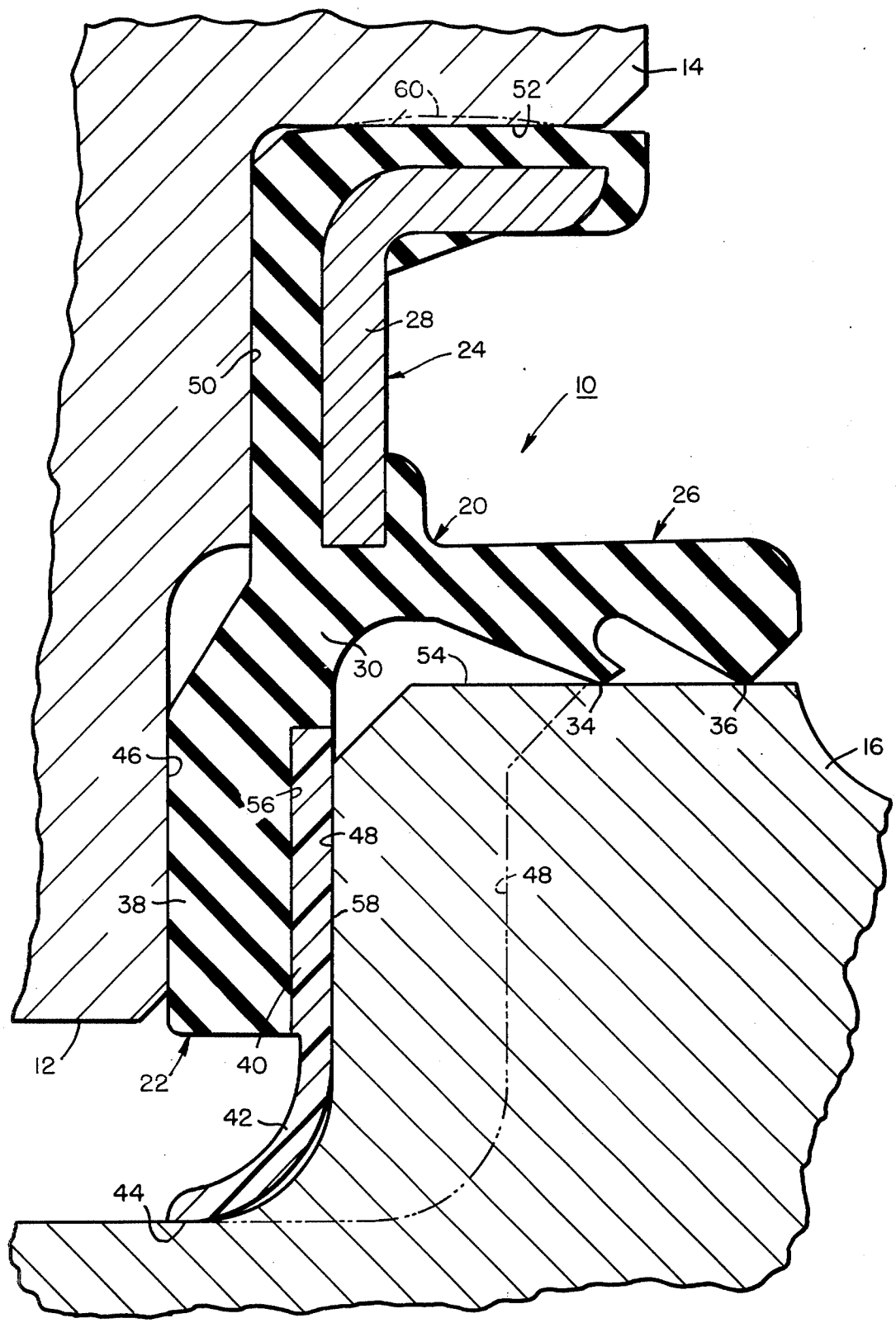
FIG. 1 is a partial cross-sectional view through a preferred embodiment of a unitary seal and thrust washer according to the present invention.

With reference now to the drawing, FIG. 1 shows a preferred embodiment of a unitary seal and thrust washer 10 according to the present invention as used in the preferred application in a bore 12 between a housing 14 (such as a dead spindle on a front wheel drive vehicle) and a shaft 16 (such as an axle or drive shaft) which is both rotatably and axially movable (to the position shown by phantom line 48) relative to the housing 14 (alternatively, of course, the shaft 16 can be one that is stationary and the housing can be movable, or there can be a combination of such movement).

The unitary seal and thrust washer 10 comprises a seal 20 and a thrust washer 22 integrally connected to the seal 20 with both the seal 20 and thrust washer 22 being made or formed from a resilient one-piece, molded, body 30 of elastomeric material. While any known type of seal can be used and made unitary with the thrust washer 22, a preferred one is shown comprising a mounting portion 24 and a sealing portion 26. The mounting portion 24 includes an annular metal reinforcing shell 28 bonded to the elastomeric body 30. The sealing portion 26 includes a pair of sealing lips 34 and 36.

The thrust washer 22 comprises a ring 38 of resilient, elastomeric material having a bearing surface 58 of reduced coefficient of friction on one radial surface thereof. In the preferred embodiment, the surface of reduced coefficient of friction is provided by an annular liner 40 of polytetrafluoroethylene bonded to said body of elastomeric material (as is known in the art, for example, by etching the polytetrafluoroethylene layer and providing a layer of adhesive between it and the elastomer and applying heat and pressure). The liner 40 can include an extension 42 forming an additional sealing lip 44 in addition to the sealing portion 26. The thrust washer 22 is located between a radial surface 46 of the housing 14 and a radial surface 48 of the shaft 16. These radial surfaces 46 and 48 can move axially relative to each other and thus the thrust washer 22 is not under load at all times (in this particular application). The resilient rubber backing (the layer of elastomeric material 38) prevents the prior art "pounding out", and instead "gives" a little bit, preventing this "pounding out" and also cushioning the blow and preventing the shock build up. While the backing layer 38 is preferably resilient, this is not essential to all aspects of this invention.

The mounting portion 24 of the seal 20 is installed with an interference fit (see, for example, the O.D. 60 of the seal 20 as molded) in the counterbore 52 and is moved axially up against a radial wall 50 of the housing 14.

In another aspect of this invention as described below in more detail with respect to FIGS. 2 and 3, the thrust washer 22 can be used alone, separate from the seal 20. The thrust washer has particular application (although it is not limited to use in such application) as a light duty thrust bearing where the thrust washer is not under load at all times and is thus subject to pounding between two axially movable members. The additional sealing lip 44 can be used, if desired, similarly as when the thrust washer 22 is unitized with a seal 20.

The additional sealing lip 44 can be formed (bent) to the shape shown in FIG. 1 if desired. Other materials can be used for the bearing surface 58, such as nylon where friction is a lesser problem, for better abrasion resistance. The sealing portion 26 shown in FIG. 1 is designed for dirt exclusion but the present invention is not limited to such type of seal. Either or both of the sealing lips 34 and 36 may be spring loaded, as is well-known in the art.

Figure 2:
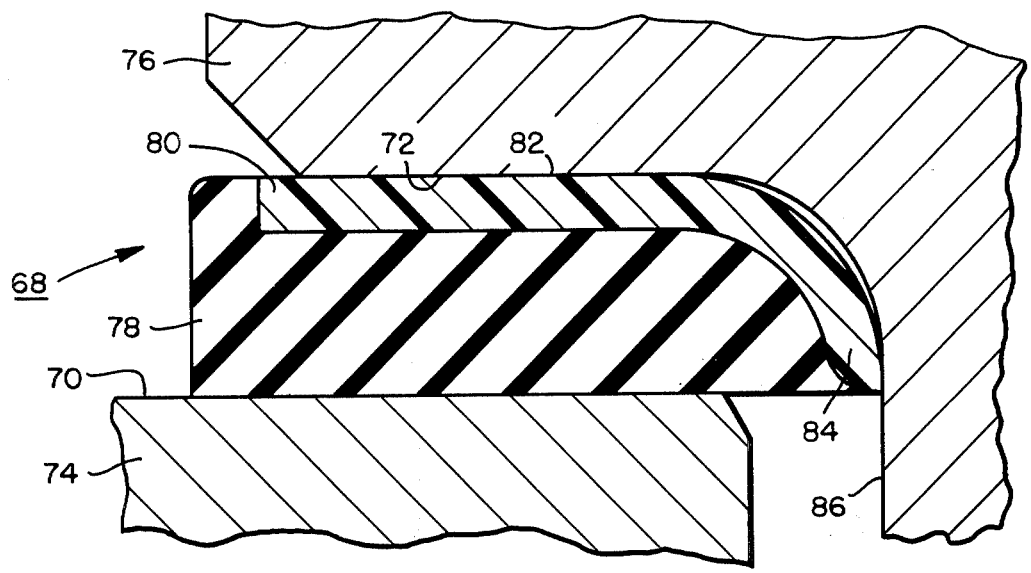
FIGS. 2 and 3 are partial cross-sectional views through two different embodiments of thrust washers according to the present invention.

FIG. 2 shows a thrust washer 68 according to another embodiment of the present invention installed between adjacent spaced-apart, radial surfaces 70 and 72 of a housing 74 and a shaft 76, respectively. The thrust washer 68 comprises a resilient backing layer 78 and a polytetrafluoroethylene liner 80 bonded to the backing layer and providing a bearing surface 82. The thrust washer 68 includes a sealing lip 84 in contact with a cylindrical surface 86 of the shaft 76. The entire lip 84 can be bonded to the resilient backing layer 78, for support, or it can be spaced therefrom as shown in FIGS. 1 and 3.

Figure 3:
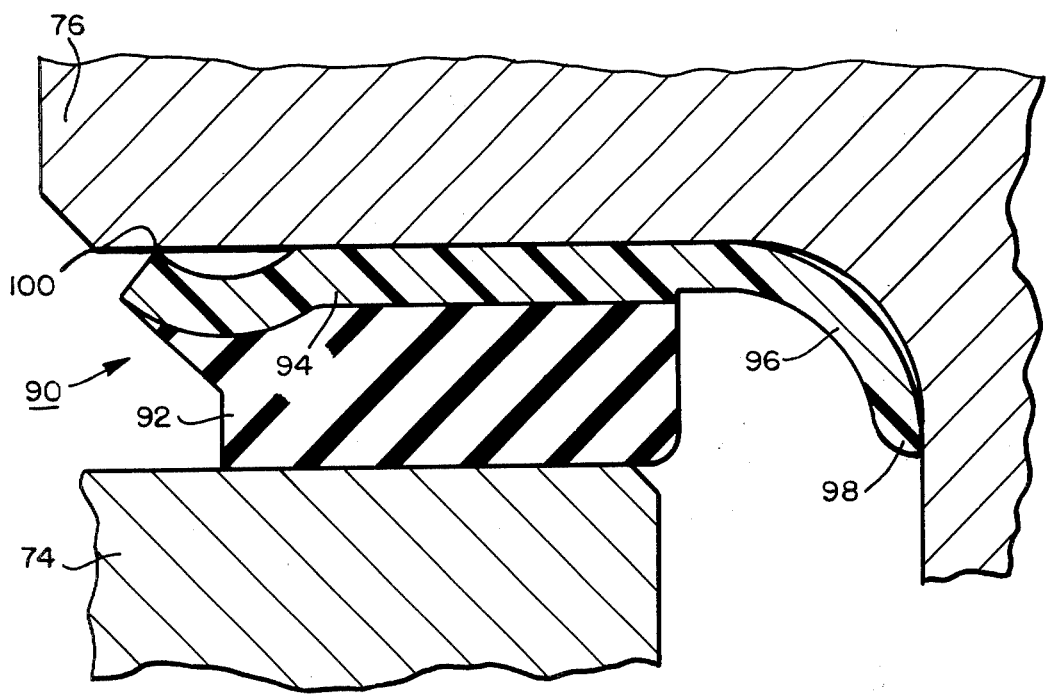

FIG. 3 shows another thrust washer 90 of the present invention, installed between the housing 74 and shaft 76. The thrust washer 90 comprises a resilient backing layer 92 and a bearing liner 94, preferably of polytetrafluoroethylene. The liner 94 includes an extension 96 forming an inner sealing lip 98 and also an outer sealing lip 100. To urge the lip 100 against the surface 72 it is curved away from the surface 72 and then back toward the surface 72 and the lip 100 is backed up, and thus biased toward the surface 72, by the backing layer 92.

The invention has been described in detail with particular reference to the preferred embodiments thereof, but it will be understood that variations and modifications can be effected within the spirit and scope of the invention as described hereinabove and as defined in the appended claims.

What is claimed is:

1. An article comprising:
   (a) a unitary seal and thrust washer comprising a seal and a thrust washer integrally connected to said seal;
   (b) said seal including a mounting portion and an integral sealing portion, said mounting portion including a cylindrical portion and a radial flange, said cylindrical portion having an O.D. surface adapted to form a press-fit in a housing bore, and said sealing portion extending axially away from the radially inner end of said radial flange, and
   (c) said thrust washer being integrally connected to said mounting portion of said seal, said thrust washer having a pair of radial contact surfaces at least one of which is a radial bearing surface, said thrust washer being adapted to be positioned between and in contact with a pair of opposed radial faces of a pair of relatively axially and rotatably movable members for carrying an axial load while accommodating rotary motion therebetween, and said thrust washer extending radially inwardly from said radial flange of said seal.

2. The article according to claim 1 wherein said unitary seal and thrust washer includes a resilient one-piece, molded body forming at least a major portion of each of said mounting portion and said sealing portion, and forming a backing layer of said thrust washer.

3. The article according to claim 1 wherein said sealing portion includes at least one sealing lip adapted to seal against a cylindrical surface.

4. The article according to claim 3 wherein said sealing portion includes a pair of spaced-apart sealing lips.

5. The article according to claim 1 wherein said mounting portion includes an annular metal reinforcing shell.

6. The article according to claim 1 wherein said thrust washer includes an additional sealing lip separate from said sealing portion of said seal.

7. The article according to claim 6 wherein said thrust washer includes a ring of resilient, elastomeric material and a liner of polytetrafluoroethylene material on one radial surface thereof forming said bearing surface.

8. The article according to claim 1 wherein said thrust washer includes a ring of resilient, elastomeric material and a liner of polytetrafluoroethylene material on one radial surface thereof forming said bearing surface.

9. The article according to claim 1 wherein said bearing surface has a low coefficient of friction and wherein said thrust washer includes a resilient backing layer and a liner bonded thereto having said bearing surface of low coefficient of friction.

10. The article according to claim 9 wherein said unitary seal and thrust washer includes a resilient one-piece, molded body forming at least a major portion of each of said mounting portion, said sealing portion, and said backing layer.

11. The article according to claim 10 wherein said thrust washer extends radially away from said seal and wherein said contact surfaces are substantially radial and are adapted to contact, respectively, a pair of substantially radial surfaces of a pair of relatively axially movable members and to maintain said radial surfaces of said members separated.

12. The article according to claim 11 wherein said thrust washer extends radially inwardly from said seal.

13. The article according to claim 12 wherein said bearing surface is located on the same side of said thrust washer as is said sealing portion.

14. The article according to claim 1 wherein said thrust washer extends radially away from said seal and has a pair of radial contact surfaces adapted to contact, respectively, a pair of radial surfaces of a pair of relatively axially movable members and to maintain said radial surfaces of said members separated.

15. The article according to claim 14 wherein said thrust washer extends radially inwardly from said seal.

16. The article according to claim 1 wherein said thrust washer has a pair of radial contact surfaces, one of which has said bearing surface, adapted to contact, respectively, a pair of radial surfaces of a pair of relatively axially movable members and to maintain said radial surfaces of said members separated.

17. A unitary seal and thrust washer comprising:
   (a) A seal including a mounting portion and an integral sealing portion, and
   (b) a thrust washer integrally connected to said seal, said thrust washer having a pair of contact surfaces one of which is a radial bearing surface, said thrust washer including an additional sealing lip separate from said sealing portion of said seal and said thrust washer including a ring of resilient, elastomeric material and a liner of polytetrafluoroethylene material on one radial surface thereof forming said bearing surface, and wherein said liner includes an extension forming said additional sealing lip.

18. Apparatus comprising a housing having a bore therethrough, a shaft extending through said bore and being rotatably movable relative to said housing, and a unitary seal and thrust washer mounted on one of said housing and shaft for sealing the space between said housing and shaft and comprising a seal including a mounting portion mounted on one of said housing and shaft and an integral sealing portion sealing against the other of said housing and shaft, and a thrust washer integrally connected to said seal and comprising a ring having a pair of contact surfaces one of which is a bearing surface, said thrust washer being located between a radial face of said shaft and a relatively axially movable radial face of said housing and wherein said sealing portion includes at least one sealing lip for sealing against a cylindrical surface of said shaft, and wherein said sealing portion includes a pair of spaced-apart sealing lips.

19. Apparatus comprising a housing having a bore therethrough, a shaft extending through said bore and being rotatably movable relative to said housing, and a unitary seal and thrust washer mounted on one of said housing and shaft for sealing the space between said housing and shaft and comprising a seal including a mounting portion mounted on one of said housing and shaft and an integral sealing portion sealing against the other of said housing and shaft, and a thrust washer integrally connected to said seal and comprising a ring having a pair of contact surfaces one of which is a bearing surface, said thrust washer being located between a radial face of said shaft and a relatively axially movable radial face of said housing and wherein said thrust washer includes an integral sealing lip separate from said sealing portion of said seal and wherein said thrust washer includes a backing layer ring of resilient elastomer and a bearing liner of polytetrafluoroethylene on one radial surface thereof and wherein said polytetrafluoroethylene liner includes an extension forming said additional integral sealing lip.

20. Apparatus comprising a housing having a bore therethrough, a shaft extending through said bore and being rotatably movable relative to said housing, and a unitary seal and thrust washer mounted on one of said housing and shaft for sealing the space between said housing and shaft and comprising a seal including a mounting portion mounted on one of said housing and shaft and an integral sealing portion sealing against the other of said housing and shaft, and a thrust washer integrally connected to said seal and comprising a ring having a pair of contact surfaces one of which is a bearing surface, said thrust washer being located between a radial face of said shaft and a relatively axially movable radial face of said housing.

21. The article according to claim 20 wherein said bearing surface has a low coefficient of friction and wherein said thrust washer includes a resilient backing layer and a liner bonded thereto having said bearing surface of low coefficient of friction.

22. The article according to claim 21 wherein said unitary seal and thrust washer includes a resilient one-piece, molded body forming at least a major portion of each of said mounting portion and seal sealing portion.

23. The article according to claim 22 wherein said thrust washer extends radially inwardly from said seal.

24. The apparatus according to claim 20 wherein said combination seal and thrust washer includes a resilient one-piece molded body forming at least a major portion of each of said mounting portion and said sealing portion and forming a backing layer of said thrust washer, and including a layer of polytetrafluoroethylene bonded to one radial surface of said ring and forming said bearing surface.

25. The apparatus according to claim 20 wherein said sealing portion includes at least one sealing lip for sealing against a cylindrical surface of said shaft.

26. The apparatus according to claim 20 wherein said thrust washer includes an additional integral sealing lip separate from said sealing portion of said seal.

27. The apparatus according to claim 26 wherein said thrust washer includes a backing layer ring of resilient elastomer and a bearing layer of polytetrafluoroethylene on one radial surface thereof.

28. A unitary seal and thrust washer comprising:
(a) A seal including a mounting portion and an integral sealing portion, and
(b) a thrust washer integrally connected to said seal, said thrust washer having a pair of contact surfaces one of which is a radial bearing surface,
and wherein said bearing surface has a low coefficient of friction and wherein said thrust washer includes a resilient backing layer and a liner bonded thereto having said bearing surface of low coefficient of friction, and wherein said unitary seal and thrust washer includes a resilient one-piece, molded body forming at least a major portion of each of said mounting portion, said sealing portion, and said backing layer, and wherein said thrust washer extends radially away from said seal and wherein said contact surfaces are substantially radial and are adapted to contact, respectively, a pair of substantially radial surfaces of a pair of relatively axially movable members and to maintain said radial surfaces of said members separated, and wherein said bearing surface is located on the same side of said thrust washer as is said sealing portion.

29. A unitary seal and thrust washer comprising:
(a) A seal including a mounting portion and an integral sealing portion, and
(b) a thrust washer integrally connected to said seal, said thrust washer having a pair of contact surfaces one of which is a radial bearing surface,
and wherein said thrust washer extends radially away from said seal and has a pair of radial contact surfaces adapted to contact, respectively, a pair of radial surfaces of a pair of relatively axially movable members and to maintain said radial surfaces of said members separated and wherein said thrust washer extends radially inwardly from said seal and wherein said bearing surface is located on the same side of said thrust washer as is said sealing portion.

* * * * *

UNITED STATES PATENT AND TRADEMARK OFFICE
CERTIFICATE OF CORRECTION

PATENT NO. : 4,166,627
DATED : September 4, 1979
INVENTOR(S) : Dean R. Bainard and Martin E. Benjamin It is certified that error appears in the above-identified patent and that said Letters Patent are hereby corrected as shown below:

Claim 27, line 3, delete "layer" and insert therefor --liner--.

Signed and Sealed this

Fifth Day of August 1980

[SEAL]

Attest:

SIDNEY A. DIAMOND

Attesting Officer

Commissioner of Patents and Trademarks